UNITED STATES PATENT OFFICE.

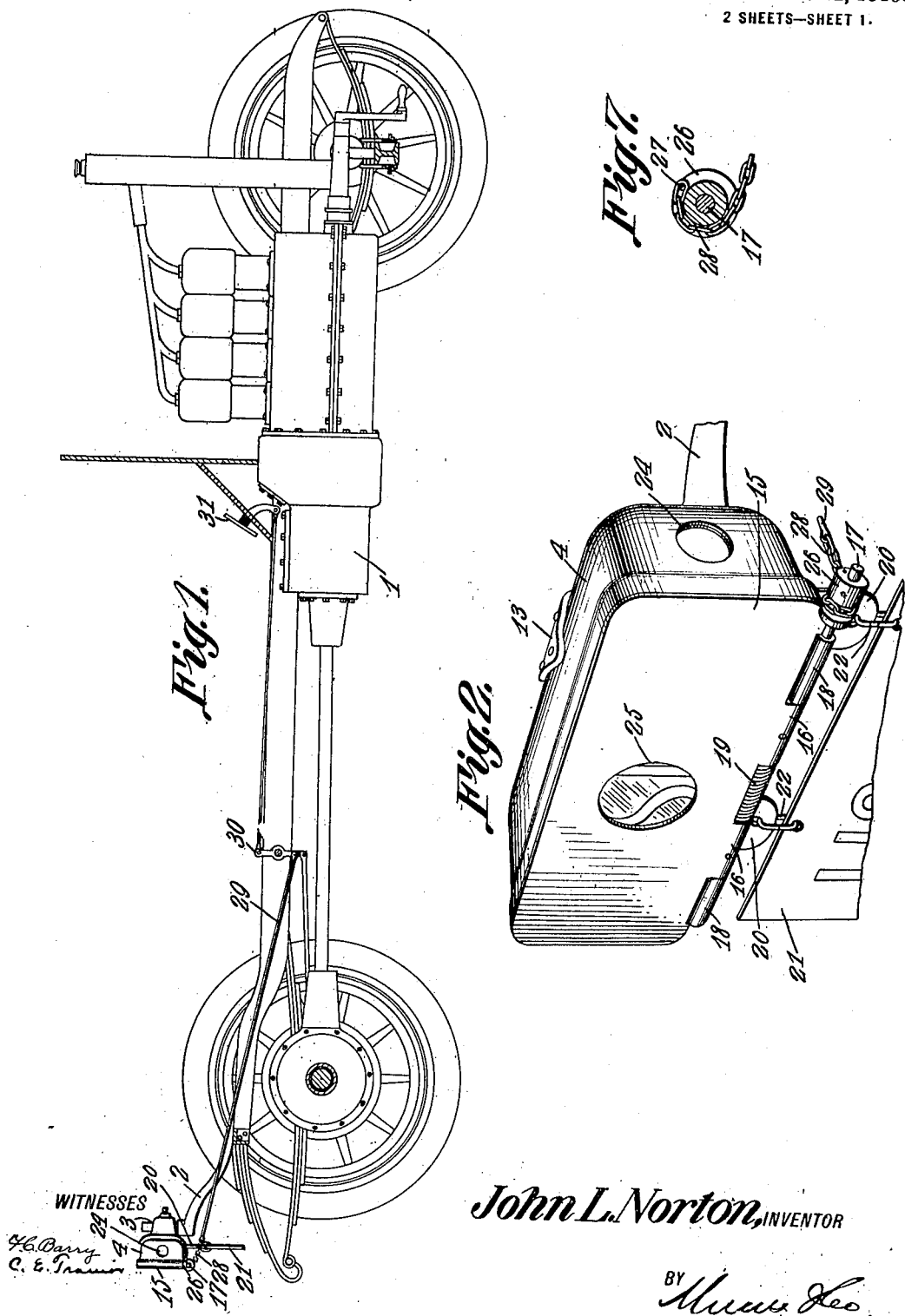

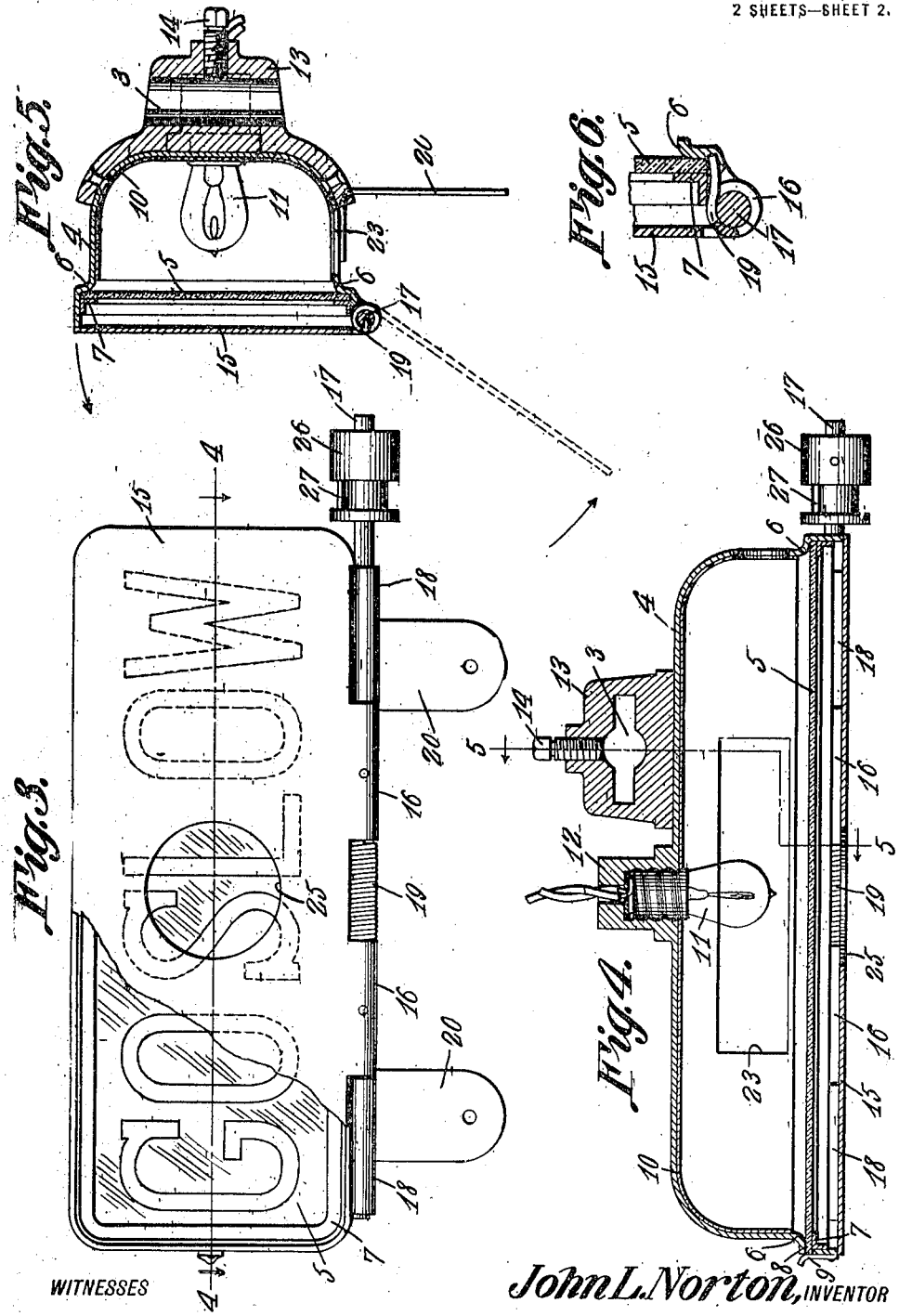

JOHN L. NORTON, OF CHICAGO, ILLINOIS.

AUTOMOBILE-SIGNAL.

1,291,613.  Specification of Letters Patent.  Patented Jan. 14, 1919.

Application filed November 29, 1916. Serial No. 134,131.

*To all whom it may concern:*

Be it known that I, JOHN L. NORTON, a citizen of the United States, and a resident of Chicago, in the county of Cook and State of Illinois, have invented a new and useful Improvement in Automobile-Signals, of which the following is a specification.

My invention is an improvement in automobile signals, and has for its object to provide mechanism of the character specified adapted for use with motor vehicles of any character, wherein a normally inoperative signal is provided arranged at the rear of the vehicle in a conspicuous position, and so connected to the brake operating mechanism of the vehicle that when the said mechanism is operated to brake the vehicle the signal will be moved into operative position to indicate to following vehicles that the vehicle in question is about to stop or check its speed.

A further object is to provide a signal adapted to be illuminated and arranged to serve as a tail lamp and having means for supporting a number plate and for illuminating the said plate.

In the drawings:—

Figure 1 is a longitudinal vertical section of an automobile frame provided with the improved signal, Fig. 2 is a perspective view of the signal in inoperative position, Fig. 3 is a rear view of the signal with parts broken away, Fig. 4 is a section on the line 4—4 of Fig. 3, looking in the direction of the arrows adjacent to the line, Fig. 5 is a section on the line 5—5 of Fig. 4, looking in the direction of the arrows adjacent to the line, Fig. 6 is a section through the hinge connection of the signal, and Fig. 7 is a section through the operating pulley.

The present embodiment of the invention is shown in connection with the frame 1 of a motor vehicle, and the signal is arranged at the rear of the vehicle, being connected with a bracket 2, secured to one of the parts of the vehicle. This bracket has an upstanding pin 3, which has oppositely extending wings or vanes as shown in Fig. 4 for a purpose to be presently described.

The signal comprises a casing consisting of a body 4, which is open at one face, and a sheet 5 of glass or other transparent material is arranged at the open side. It will be noticed from an inspection of Figs. 4 and 5 that the casing is enlarged at the open side to form a species of ledge or shoulder 6, against which the sheet abuts, and a frame 7 of angular material is seated in the enlargement outside of the glass to hold the glass in place. A slot 8 is provided at one end of the casing through which the glass may be removed or replaced, and a latch plate 9 is pivoted to the casing at the center of the slot, the said plate being adapted to extend across the slot to hold the glass in place as shown in Figs. 3 and 4, and the plate is pivoted to the casing so that it may be turned to release the glass.

A legend is arranged on the glass, as for instance, the words "Go slow". They are painted or etched on the glass, and the glass is preferably colored red. The interior of the body of the casing is lined with a reflecting medium indicated at 10, and the interior of the said casing is free from angles and corners as shown to provide for a maximum reflection of light.

A source of light as for instance, an incandescent bulb 11 is arranged within the casing, the bulb being screwed into a socket 12 at the rear and center of the casing. This bulb is supplied with current in any suitable manner, and it will be evident that when the bulb is illuminated the interior of the casing will be illuminated and the light rays will be reflected through the sheet bearing the legend. The casing is provided with a bearing socket 13 at the rear and at one side of the socket 12 for engaging the pin 3 of the bracket, and a set screw 14 is threaded through the socket into engagement with the pin to prevent displacement of the casing.

A plate 15 of opaque material as for instance, metal, is provided for closing the open side of the casing, and the said plate is provided at its lower edge with bearings 16, which are journaled on a rod or pintle 17. This rod or pintle is journaled in bearings 18 on the body of the casing, and a coil spring 19 is arranged on the rod at the center thereof, the said spring being connected with the rod and the plate 15 in such manner that the spring will normally hold the plate 15 closed, that is, in the position of Figs. 4 and 5.

Mechanism to be later described, is connected with the shaft 17 for swinging the plate or shutter 15 into the dotted line position of Fig. 5 to expose the legend when the brake is operated, and the casing 4 is provided near each end with a depending perforated lug 20, for permitting a license or number plate 21 to be connected to the casing, the plate being connected to the lugs by links 22 as shown in Figs. 1 and 2. The casing is also provided with an opening in the form of a slot 23 on its under side and directly above the number plate for permitting the bulb 11 to illuminate the numerals on the number plate 21. The casing is also provided at its inner end with an opening 24, and the plate or shutter 15 is provided with a central opening 25 which will permit a red light to be visible when the bulb is illuminated, thus serving as a tail lamp.

One end of the shaft 17 is extended as shown in Figs. 3 and 4, and a pulley 26 is secured to the extended end. This pulley has an annular groove near its inner end as shown, and a pin 27 is arranged transversely of the groove. A flexible member 28 as for instance, a chain, is connected with the pin 27 at one end, and the other end of the flexible member is connected with one end of a link 29. This link extends forwardly to a connection with the operating lever 30 of the brake mechanism, and the link is so connected with the brake mechanism that when the brake pedal 31 is operated to set the brake, traction will be exerted on the flexible member 28, and this flexible member is so arranged on the pulley 26 that when traction is exerted on the chain the shaft 7 will be rotated in a direction to swing the shutter into the dotted line position of Fig. 5.

In use, the device takes the place of the ordinary tail lamp, being supported on the tail lamp bracket 20 which is arranged on the hood or on the vehicle as may be desired. The chain 28 winds upon the pulley 26 in a direction such that when the chain is pulled the chain will be turned to open the shutter. The spring 19 normally holds the shutter closed but whenever the pedal 31 is depressed to set the brake, the shaft 17 will be rotated in a direction to swing the shutter downward to expose the legend. It will be understood that the operating member for the shaft 17 may be connected at any desired point.

I claim:

A signal comprising a casing having a transparent rear wall provided with a legend adapted to be illuminated by a source of light, a shutter for closing over the transparent rear wall and hinged at the bottom of the casing, a pintle pin for hinging the shutter to the casing and extended beyond the casing at one end, a wheel on the said end, a flexible member winding upon the wheel at one end and adapted for connection at the other end with the brake operating mechanism of a vehicle, a spring for normally holding the shutter closed, said shutter having a central opening and the casing having an opening at its under side, and means for supporting a number plate at the said opening to be illuminated by the light shining therethrough.

JOHN L. NORTON.